United States Patent [19]

Chenot

[11] 3,721,481
[45] March 20, 1973

[54] ROLLER DEVICE WITH IMPROVED HUB CONSTRUCTION

[75] Inventor: Louis A. Chenot, Oklahoma City, Okla.

[73] Assignee: Fife Corporation, Oklahoma City, Okla.

[22] Filed: June 22, 1971

[21] Appl. No.: 155,444

[52] U.S. Cl. .................................................. 308/20
[51] Int. Cl. .............................................. F16c 13/02
[58] Field of Search ...... 308/20, 72, 191, 208, 15, 18; 29/116 R; 193/35 R, 25 C, 35 J; 220/67, DIG. 29

[56] References Cited

UNITED STATES PATENTS

| 1,714,268 | 5/1929 | Jones | 308/36 |
| 2,290,515 | 7/1942 | Williams | 220/DIG. 9 |
| 2,287,357 | 6/1942 | Nyborg | 308/20 |
| 2,531,334 | 11/1950 | Grenat | 308/15 |
| 1,856,547 | 5/1932 | Gotthardt | 308/20 |

FOREIGN PATENTS OR APPLICATIONS 622,445  9/1962  Belgium .............................. 308/20

Primary Examiner—Charles J. Myhre
Assistant Examiner—Barry Grossman
Attorney—Dunlap, Laney, Hessin & Dougherty

[57] ABSTRACT

A welded roller comprising a cylindrical roller tube with a roller hub welded to each end face thereof. In one form, a circumferential concave seating surface formed about the medial portion of each roller hub intersects the respective end of the roller tube along the line of intersection of the respective end face and the cylindrical inner surface of the roller tube. In another form, a circumferential frusto-conical seating surface formed about the medial portion of each roller hub engages a chamfered annular surface intersecting the respective end face and the cylindrical inner surface of the roller tube.

20 Claims, 3 Drawing Figures

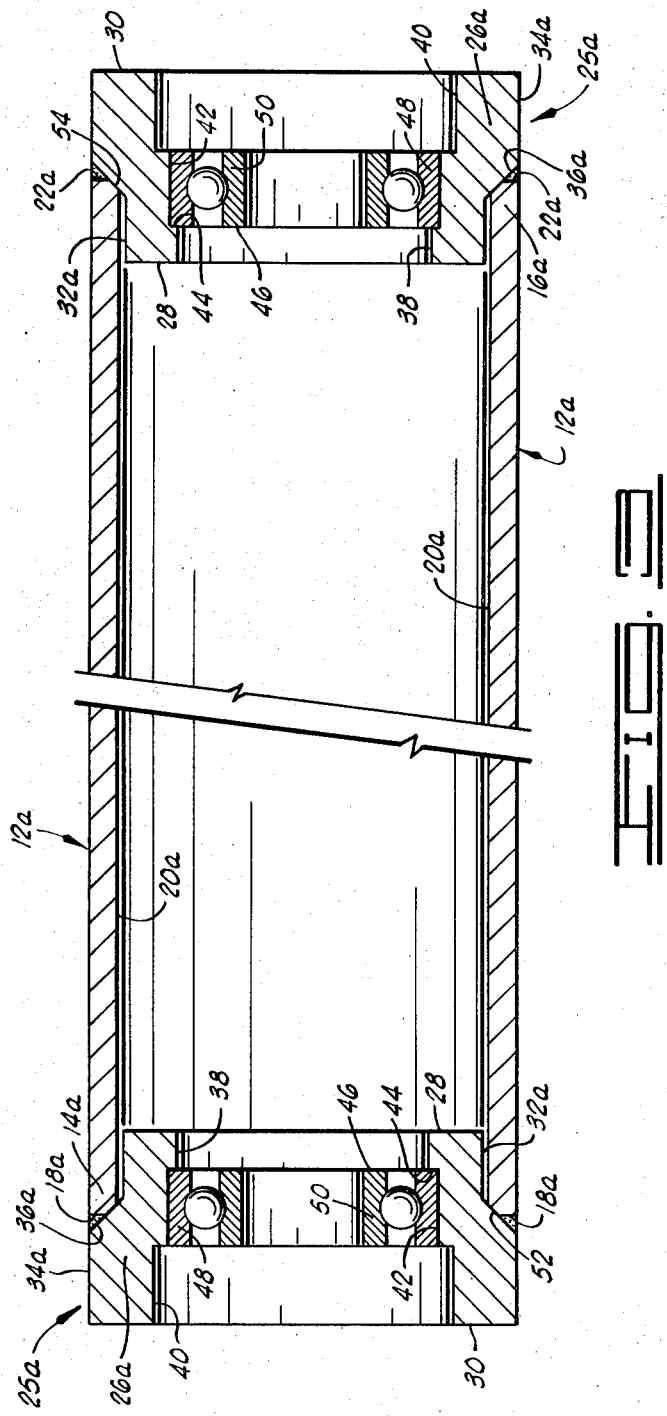

ROLLER DEVICE WITH IMPROVED HUB CONSTRUCTION

BACKGROUND OF THE INVENTION

1. Field of the Invention

This invention relates generally to improvements in roller construction, and more particularly, but not by way of limitation, to improvements in the construction of guide rollers for use with moving webs.

2. Description of the Prior Art

The prior art contains many teachings of roller construction using hubs secured to the ends of tubular members. The tubular members are usually fabricated from seamless tubing obtained from commercial suppliers. The concentricity of the inner and outer diameters of available commercial grade tubing is not held within strict tolerances, thus requiring the performance of additional machining operations on the tubing before it is suitable for service as a component of a high-speed roller.

An uncorrected variation in concentricity of the tubing results in dynamic and static imbalance in a roller which may be corrected by balancing the roller by the removal or addition of mass to the roller structure. Static and dynamic balancing of rollers is an expensive process requiring skilled workers and expensive machinery for its satisfactory accomplishment.

SUMMARY OF THE INVENTION

The present invention contemplates a roller assembly comprising a cylindrical roller tUbe having a cylindrical inner wall and opposite ends each lying in a plane normal to the axis of the cylindrical inner wall, and a roller hub fixedly secured to one end of said roller tube. The roller hub includes a hub body having a first end and a second end. A cylindrically shaped first peripheral surface is formed on the hub body intersecting the first end thereof, the diameter of the first peripheral surface being less than the diameter of the inner wall of the roller tube, said first peripheral surface being disposed within the roller tube concentric with the inner wall thereof. A circumferential second peripheral surface is formed on the hub body coaxial with the first peripheral surface. The diameter of the second peripheral surface is greater than the diameter of the inner wall of the roller tube. A circumferential seating surface is formed on the hub body coaxial with the first peripheral surface and intersecting the first peripheral surface and the second peripheral surface. The circumferential seating surface engages the end of the roller tube.

An object of the present invention is to provide an improved roller which may be economically constructed using commercial grade tubing and requiring a minimum amount of static and dynamic balancing.

Another object of the present invention is to provide an improved roller which may be quickly and economically assembled using automatic machinery for aligning and welding the components thereof.

Still another object of the present invention is to provide an improved roller hub for use in a welded roller.

One further object of the present invention is to provide an improved roller having a long service life.

Other objects and advantages of the present invention will be evident from the following detailed description when read in conjunction with the accompanying drawings.

BRIEF DESCRIPTION OF THE DRAWINGS

FIG. 3 is a vertical cross-sectional view similar to FIG. 1 illustrating the construction of another embodiment of a roller constructed in accordance with the present invention.

DESCRIPTION OF THE PREFERRED EMBODIMENT

Figure 1:
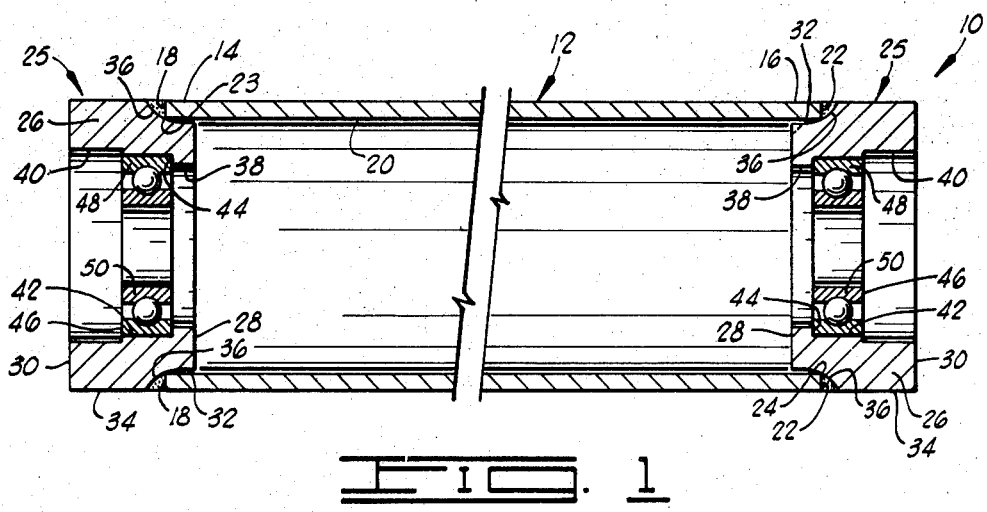
FIG. 1 is a vertical cross-sectional view of a roller constructed in accordance with the present invention.
Figure 2:
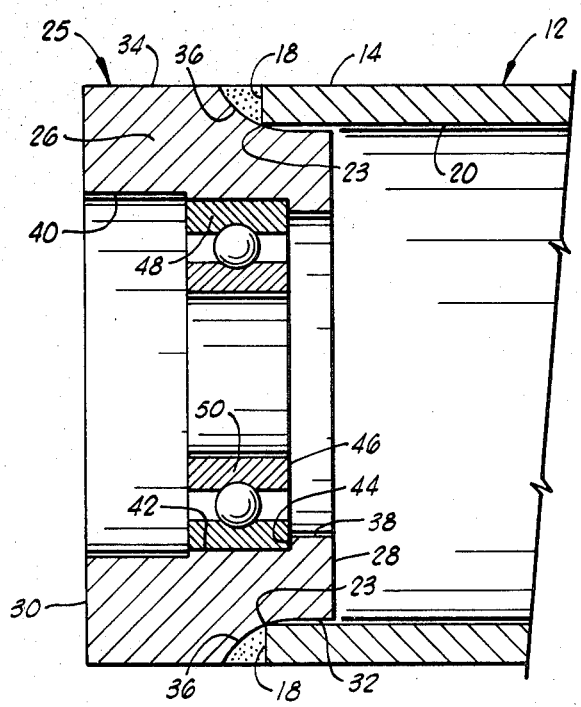
FIG. 2 is an enlarged, fragmentary vertical cross-sectional view of the roller of FIG. 1, more clearly illustrating the construction of the roller hub.

Referring to the drawings and to FIG. 1 in particular, shown therein and generally designated by the reference character 10 is a roller constructed in accordance with the present invention. The roller 10 includes a cylindrical roller tube 12 having a first end portion 14 and a second end portion 16. A first end face 18 is formed on the first end portion 14 and lies in a plane normal to the axial centerline of the cylindrical inner surface 20 of the roller tube 12. A second end face 22 is formed on the second end portion 16 and lies in a plane parallel to the plane of the first end face 18. The first and second end faces 18 and 22 intersect the cylindrical inner surface 20 along circular lines 23 and 24 respectively, each of which lies in a plane normal to the axial centerline of the inner surface 20.

The first and second end faces 18 and 22 may be conveniently formed on the roller tube 12 by chucking the roller tube stock in a conventional lathe with the inner cylindrical surface thereof coaxial with the lathe chuck and performing a cutting operation thereon normal to the axis of rotation with a conventional cut-off tool.

A pair of roller hubs 25 are disposed respectively in the first end portion 14 and the second end portion 16 of the roller tube 12. Since the hubs 25 are identical, only one need be described in detail. Each roller hub 25 comprises a hub body 26 having a first end 28 and a second end 30 opposite and parallel thereto. A cylindrically shaped first peripheral surface 32 is formed on the hub body intersecting the first end 28 thereof at right angles. The diameter of the first peripheral surface 32 is slightly less than the diameter of the inner surface 20 of the roller tube 12. A cylindrically shaped second peripheral surface 34 is formed on the hub body 26 coaxial with the first peripheral surface 32 and intersecting the second end 30 of the hub body 26. The diameter of the second peripheral surface 34 is substantially equal to the outer diameter of the roller tube 12.

A circumferential seating surface 36 is formed about the medial portion of the hub body 26 and interconnects the first peripheral surface 32 and the second peripheral surface 34. The circumferential seating surface 36 is arcuately concave and tangentially intersects the first peripheral surface 32. The circumferential seating surface 36 intersects the second peripheral surface 34 along a continuous circular line which lies in a plane normal to the axis of the first peripheral surface 32.

A bore 38 is formed in the hub body 26 coaxial with the first peripheral surface 32 and intersecting the first end 28 thereof. A first counterbore 40 is formed in the hub body 26 coaxial with the bore 38 and intersecting the second end 30 thereof. A second counterbore 42 is formed in the hub body 26 coaxial with and adjacent the first counterbore 40 and has a diameter less than the diameter of the first counterbore 40 and greater than the bore 38. The bore 38 and the second counterbore 42 form an annular shoulder 44 extending normal to the axis of the bore 38. A bearing 46 is secured within the second counterbore 42 with the outer race 48 thereof abutting the annular shoulder 44. The diameter of the outer race is sized to form a press fit with the second counterbore 42 to retain the bearing 46 therein. The inner race 50 of the bearing 46 rotates freely about an axis coaxial with the first peripheral surface 32. The bearing 46 may be of conventional ball or roller design depending upon the application.

To assemble the roller 10, the two roller hubs 25 are supported in axial alignment by an appropriate fixture with the respective first ends 28 facing one another. The roller tube 12 is positioned in substantial axial alignment with and between the two roller hubs 25 which are then moved axially together with the respective first peripheral surfaces 32 disposed within the inner surface 20 of the tube 12 until the end portions 14 and 16 of the roller tube are engaged by the respective circumferential seating surfaces 36 formed on the roller hubs 25. The end portions 14 and 16 are engaged by the respective circumferential seating surfaces 36 along the respective lines of intersection 23 and 24 of the end faces 18 and 22 with the inner surface 20. The cylindrical inner surface 20 of the roller tube 12 is thereby coaxially aligned with the roller hubs 25. The roller hubs 25 and the roller tube 12 are retained in the axially aligned position by axially inward pressure exerted by the fixture on the respective roller hubs 25. Simultaneous with this axial inward pressure, the first and second portions 14 and 16 of the roller tube are welded to the respective roller hubs 25, the weld beads being positioned between the circumferential seating surface 36 of the respective roller hubs 25 and the first and second end faces 18 and 22 of the roller tube 12. The two welding operations may be conveniently carried out by automatic welding means wherein the roller hubs and roller tube are automatically rotated in the assembled and aligned position while the two welds are being made simultaneously by two preset welding heads.

Upon completion of the two weld connections, the assembled roller 10 is positioned in a lathe and a facing cut is made on the outer surface thereof to remove excess weld material and to provide a smooth cylindrical outer surface coaxial with the centerline of the roller.

It should be noted that the weld connections between the roller tube 12 and the respective roller hubs 25 are each substantially radially aligned with the bearing 46 carried in the respective roller hub adjacent thereto. This positioning of the weld connection serves to eliminate any bending moment at the weld which would result from misalignment of the weld and the supporting bearing.

EMBODIMENT OF FIG. 3

A roller 10a comprising two slightly modified roller hubs 25a and a roller tube 12a is illustrated in FIG. 3. The hub rollers 25a are similar to the hub roller 25 described above except that a circumferential seating surface 36a is formed on the medial portion of each hub body 26a which interconnects the first peripheral surface 32a and the second peripheral surface 34a formed thereon. The circumferential seating surface 36a is frusto-conical in shape and intersects the first and second peripheral surfaces 32a and 34a respectively along circular lines each of which lies in a plane normal to the axis of the first peripheral surface 32a. The angle between the seating surface 36a and the axis of the first peripheral surface 32a is preferably 45°.

The roller tube 12a is similar to the roller tube 12 except that chamfered annular surfaces 52 and 54 are formed on the first and second end portions 14a and 16a of the roller tube 12a. The chamfer angle of the surfaces 52 and 54 matches the angle of the seating surface 36a. The annular surface 52 intersects the first end face 18a and the cylindrical inner surface 20a respectively along circular lines which lie in planes normal to the axis of the inner cylindrical surface 20a. Similarly, the annular surface 54 intersects the second end face 22a and the cylindrical inner surface 20a respectively along circular lines which also lie in planes normal to the axis of the inner cylindrical surface 20a.

The assembly of the roller 10a is identical to the assembly of the roller 10, as described above, except that the end portions 14a and 16a of the roller tube 12a are engaged by the respective circumferential seating surfaces 36a of the roller hubs 25a along the respective matching annular surfaces 52 and 54. The weld beads are positioned between circumferential seating surface 36a of the respective roller hubs 25a and the first and second end faces 16a and 22a of the roller tube 12a.

From the foregoing, it will be apparent that the present invention provides a novel roller device which may be easily assembled using automatic machinery and welding devices. It will also be apparent that the present invention provides a novel roller device which allows the use of nonconcentric tubing in its construction by providing for axial alignment of the inner cylindrical wall of the tubing with the axial centerline of the hubs thereby virtually eliminating static and dynamic imbalance problems.

Changes may be made in the combination and arrangement of the parts or elements, as heretofore set forth in the specification and shown in the drawings, without departing from the spirit and scope of the invention.

What is claimed is:

1. A roller assembly comprising:
    a cylindrical roller tube having a cylindrical inner wall and opposite ends each lying in a plane normal to the axis of the cylindrical inner wall;
    roller hub means fixedly secured to one end of said roller tube for supporting said roller tube and rotating therewith, said roller hub means comprising:
    a hub body having a first end and a second end;
    a cylindrically shaped first peripheral surface formed on said hub body adjacent the first end thereof, the diameter of said first peripheral surface being less than the diameter of the inner wall of the roller tube, said first peripheral surface being disposed within said roller tube and being concentric with the inner wall thereof;

a circumferential second peripheral surface formed on said hub body adjacent the second end thereof and coaxial with said first peripheral surface, the diameter of said second peripheral surface being greater than the diameter of the inner wall of said roller tube; and a circumferential seating surface formed on said hub body coaxial with said first peripheral surface and intersecting said first peripheral surface and said second peripheral surface, said seating surface engaging one end of said roller tube.

2. A roller assembly as defined in claim 1 wherein said circumferential seating surface has a concave periphery.

3. A roller assembly as defined in claim 2 wherein said circumferential seating surface intersects said first peripheral surface tangentially.

4. A roller assembly as defined in claim 3 wherein said circumferential seating surface engages said roller tube along the line of intersection of said end and said inner wall thereof.

5. A roller assembly as defined in claim 4 wherein said circumferential second peripheral surface is cylindrically shaped.

6. A roller assembly as defined in claim 5 wherein said first and second peripheral surfaces intersect the first and second ends of said hub body respectively.

7. A roller assembly as defined in claim 6 wherein said roller hub means is fixedly secured to said roller tube by welding.

8. A roller assembly as defined in claim 7 wherein said roller hub means is welded to said roller tube by means of an annular weld bead along the line of intersection of said roller hub and said roller tube.

9. A roller assembly as defined in claim 8 wherein bearing means is carried by said roller hub means in coaxial alignment therewith.

10. In a roller assembly of the type which includes a cylindrical roller tube having a cylindrical inner wall and an end face intersected by the cylindrical inner wall and lying in a plane normal to the axis of the cylindrical inner wall, an improved hub comprising:

a hub body means fixedly secured to one end face of said roller tube for supporting said roller tube and rotating therewith, said hub body means having a first end and a second end;

a cylindrically shaped first peripheral surface formed on said hub body intersecting the first end thereof, the diameter of said first peripheral surface being less than the diameter of the cylindrical inner wall of the roller tube;

a circumferential second peripheral surface formed on said hub body intersecting the second end thereof and coaxial with said first peripheral surface, the diameter of said second peripheral surface being greater than the diameter of the cylindrical inner wall of the roller tube; and an arcuately concave circumferential seating surface formed on said hub body coaxial with said first peripheral surface and tangentially intersecting said first peripheral surface and extending therefrom to intersect said second peripheral surface.

11. A roller hub as defined in claim 10 characterized further to include:

a bore passing through said hub body coaxial with said first peripheral surface.

12. A roller hub as defined in claim 11 characterized further to include:

a counterbore formed in the second end of said hub body coaxial with said bore, said counterbore having a diameter greater than the diameter of said bore; and bearing means carried in said counterbore for providing rotational support to said roller hub.

13. A roller hub as defined in claim 12 wherein said first peripheral surface intersects the first end of said hub body.

14. A roller hub as defined in claim 13 wherein said second peripheral surface is cylindrically shaped.

15. A roller hub as defined in claim 14 wherein said second peripheral surface intersects the second end of said hub body.

16. A roller assembly as defined in claim 1 wherein said circumferential seating surface is frusto-conical in shape.

17. A roller assembly as defined in claim 16 wherein one end of said roller tube has a chamfered annular surface engaging a portion of said frusto-conically shaped circumferential seating surface.

18. A roller assembly as defined in claim 17 wherein said circumferential second peripheral surface is cylindrically shaped, and wherein said first and second peripheral surfaces intersect the first and second ends of said hub body respectively.

19. A roller assembly as defined in claim 18 wherein said roller hub means is secured to said roller tube by means of an annular weld bead disposed between the circumferential seating surface of said hub body and the one end of said roller tube.

20. A roller assembly as defined in claim 19 wherein bearing means is carried by said roller hub body in coaxial alignment therewith.

* * * * *